United States Patent [19]

Jones et al.

[11] 3,863,507

[45] Feb. 4, 1975

[54] SAMPLE MIXING AND METERING APPARATUS

[75] Inventors: Alan Richardson Jones, Miami; Thomas J. Godin, Hollywood, both of Fla.

[73] Assignee: Coulter Electronics, Inc., Hialeah, Fla.

[22] Filed: Mar. 16, 1973

[21] Appl. No.: 342,161

[52] U.S. Cl. .............................. 73/423 A
[51] Int. Cl. ............................. G01n 31/00
[58] Field of Search ........... 23/253, 259; 73/423 A; 141/130

[56] References Cited
UNITED STATES PATENTS

| | | | |
|---|---|---|---|
| 3,269,800 | 8/1966 | Lukrec | 23/253 R |
| 3,301,065 | 1/1967 | Fahrenbach | 73/423 A |
| 3,327,535 | 6/1967 | Sequeira | 73/423 A |
| 3,747,412 | 7/1973 | Jones | 73/422 GC |

Primary Examiner—S. Clement Swisher
Attorney, Agent, or Firm—Silverman & Cass, Ltd.

[57] ABSTRACT

The apparatus includes a sampling head adapted to be mounted at a sample pickup station. The head includes a hollow sample pickup probe adapted to be inserted into a sample container at the sample pickup station for extracting a given amount of fluid sample from the container. The pickup probe is movable between a first or sampling position and a second or retracted position by means of an air cylinder. A valve mechanism connected to the probe is operable on movement of the probe to the sampling position for connecting the probe to a device for withdrawing fluid from the sample container through the probe. The air cylinder not only moves the probe but also, and at the same time, operates the valve mechanism, between first and second valve positions. In the second position the valve mechanism effects fluid connections for mixing a given amount of the fluid sample with another fluid, for simultaneously transferring the mixture to a receptacle and for drawing de-ionized water through the probe for cleaning same. The apparatus also includes a water delivery trough and a mechanism for moving same into position under the raised probe. The air cylinder is operable to lower the probe into the trough with a lost motion mechanism of the sampling head permitting the valve mechanism to remain in the second valve position while the probe is so lowered.

6 Claims, 12 Drawing Figures

SAMPLE MIXING AND METERING APPARATUS

CROSS-REFERENCE TO RELATED APPLICATION

The subject matter of this application is related to subject matter disclosed in U.S. application Ser. No. 191,248 filed on Oct. 21, 1971, and now issued as U.S. Pat. No. 3,747,412 and in U.S. application Ser. No. 285,196, filed Aug. 31, 1972. Both of the above applications are assigned to the assignee of the present application.

BACKGROUND OF THE INVENTION

The present invention relates to an apparatus including a sampling probe for sampling and mixing liquids, for delivering the mixture in a predetermined proportion to a reaction tube for testing and for cleaning the probe.

In the art of automatic analysis equipment, it is normally required that a sample fluid be diluted with a second fluid in order to provide a diluted sample which is subjected to testing. In the case of particle counting and sizing apparatus, the concentrated sample may be diluted with a nonreactive diluent in order to provide a diluted sample more easily processed in the automatic counting and sizing apparatus. For example, whole blood could be diluted with a saline solution to achieve a diluted blood sample. In the case of a chemical analysis apparatus, the concentrated sample may be mixed with some liquid chemical that is to start a reaction therewith. For example, in blood chemistry apparatus, the undiluted patient's serum is diluted with different reagents to commence reactions leading to colorimetric testing of the change in absorbance of the resulting diluted sample.

Examples of known devices for picking up a sample and/or for mixing or diluting a concentrated sample are disclosed in the following U.S. Patents:

| U.S. Pat. No. | Class |
|---|---|
| 2,757,541 | 73–422 |
| 2,867,355 | 222–136 |
| 3,291,347 | 222–136 |
| 3,419,358 | 23–230 |
| 3,476,880 | 73–422 |
| 3,489,525 | 23–253 |
| 3,523,756 | 23–230 |
| 3,530,721 | 73–423 |
| 3,549,994 | 324–71 |
| 3,567,389 | 23–253 |
| 3,635,094 | 73–423A |
| 3,700,562 | 195–103.51S |
| 3,716,338 | 23–259 |

In all cases of sampling and mixing, there are certain requirements that must be met. The concentrated sample has to be withdrawn from a body of such sample and a specific volume thereof measured and isolated. The diluting fluid or reagent must be supplied in a predetermined volume so that the proportions of sample to diluent are known. The two liquids must be mixed. The mixture must then be delivered to a location where the diluted sample can be received in a suitable receptacle in which it will be tested.

Accurate measurement and thorough mixing are essential. In addition, the minimum of contamination must be effected between the processing of different samples. Furthermore, it is desirable to prevent plugging of the probe and, in the event plugging does occur, it is desirable that the parts of the sampling head permit easy cleaning or unplugging of the probe.

All of the above comprise problems which the apparatus described herein is intended to solve in a highly effective manner. In particular, the apparatus is operable to clean the probe between the sampling of different samples, thereby to prevent plugging of the probe and cross contamination between samplings.

SUMMARY OF THE INVENTION

According to the invention, there is provided for use with a sample pickup probe, an apparatus including a trough, a system for delivering cleaning fluid to the trough and mechanisms for causing relative movement between the trough and the probe to bring the probe into the trough whereby cleaning fluid can be drawn through the probe for cleaning same at a point in time between samplings of different fluids.

Also according to the invention, there is provided a sampling head for use at a sample pickup station, the head including a hollow sample pickup probe adapted to be inserted into a sample container or cup at the sample pickup station for extracting a given amount of fluid sample from the container. The probe is movable between a first or sample position and a second or retracted position and is connected to a valve mechanism operable upon movement of the probe to the sample position for connecting the probe to a device for withdrawing fluid from the sample container through the probe. A mechanism is provided for moving the probe and simultaneously operating the valve mechanism whereby the valve mechanism is operated by the moving mechanism to connect the probe to the withdrawing means at the same time the probe is moved by the moving mechanism to the sample position.

Preferably the probe is moved out of the sample container at a maximum speed which results in a minimum pickup of sample on the exterior surface of the probe, the desired rate of speed being dependent upon the surface tension of the fluid sample.

Also, preferably, each sampling head has a connection to a diluent or reagent pump, a delivery conduit and various connections to sources of vacuum and pressure to cause the operation thereof. The valve mechanism preferably includes a pair of valve blocks which move relative to one another in face to face planar engagement by means of a suitable pneumatically operated cylinder constituting the moving mechanism which at the same time causes the probe to be dipped downwardly or raised according to the operation of a suitable control mechanism.

When a sample arrives at the sample pickup or aspirating station where one of the sampling heads is located and assuming that the analysis calls for the sample to be mixed with a diluent or a reagent, the probe dips down into the sample, sucks up a quantity of sample, and then withdraws from the cup. During these movements, the diluent or reagent is first drawn into a pump, second, it is mixed with a specific volume of sample and third, it is delivered by means of a conduit or tubing to a reaction tube apart from the sampling head. Subsequently, the trough is moved to a position beneath the probe and above the container where cleaning fluid is delivered to the trough. After a given amount of fluid is delivered to the trough, the probe is lowered a short distance into the trough with a connection maintained from the probe through the sampling head to a source of vacuum so that cleaning fluid can be sucked through the probe. All of this is done automatically after which the sampling head is ready for the next cup to come along.

In this way, the cups are never disturbed as they are moved along their path. Also, a different head may be used for each different kind of test and a minimum of sample and diluent or reagent is wasted. Moreover, the apparatus for drawing cleaning fluid through the probe ensures against cross contamination between samplings and minimizes, if not altogether eliminates plugging of the probe.

DESCRIPTION OF THE PREFERRED EMBODIMENT

Figure 1:
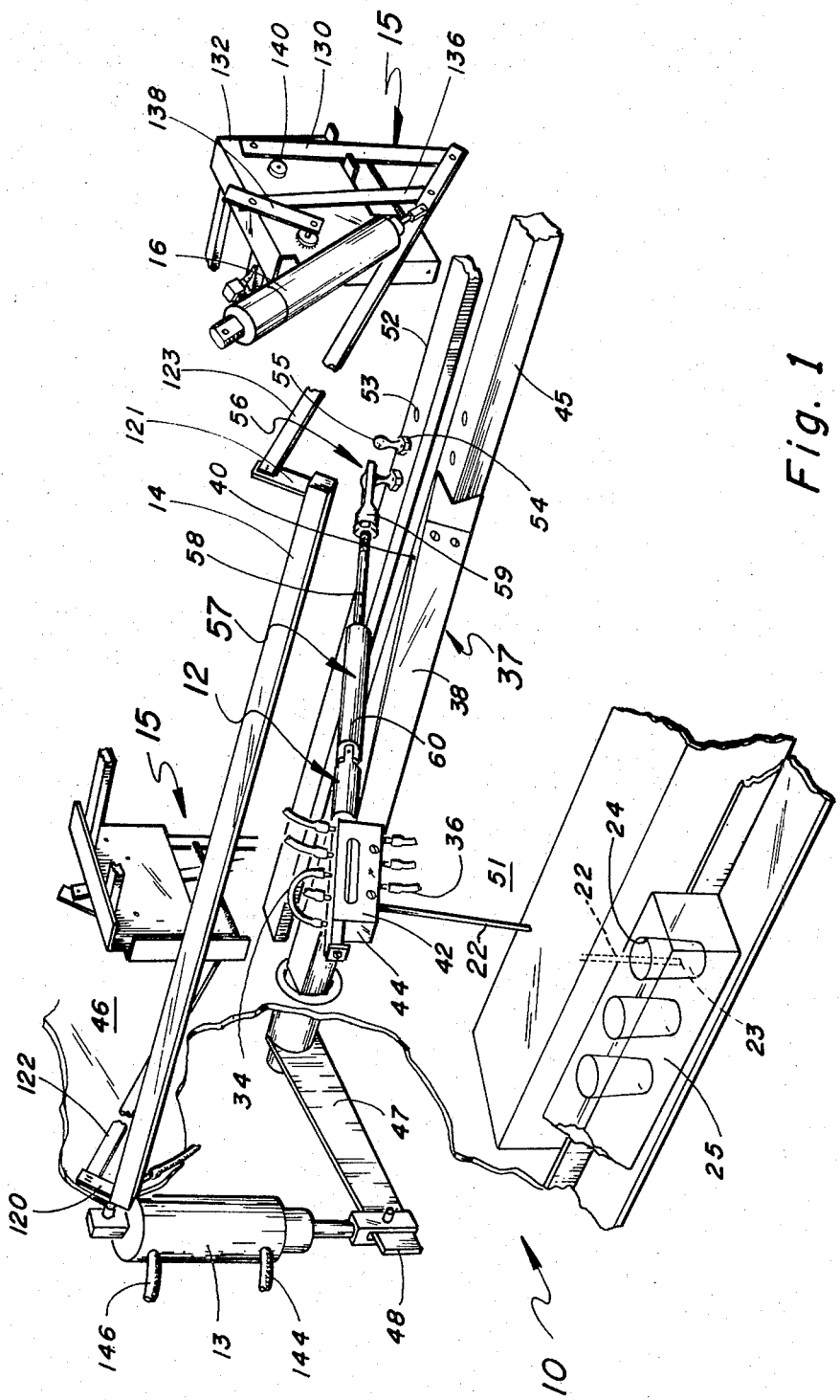
FIG. 1 is a perspective view of the apparatus including a sampling head, a trough and mechanisms for moving the head and trough.

Referring now to the drawings in greater detail, portions of a sampling and mixing apparatus 10 are shown in FIG. 1. The apparatus 10 includes a sampling head 12, a cylinder 13 for moving the head, a trough 14, and a mechanism 15 for moving the trough 14 and including a cylinder 16.

The sampling head 12 has a construction enabling it to be mounted with a plurality of like sampling heads (not shown) for simultaneous operation therewith and includes a valve mechanism 17 (FIGS. 4, 6, 7 and 8) defined by first and second valve blocks 18 and 20 respectively, linearly movable (slidable) relative to each other between two valve positions, namely, a sampling position and a delivery position. The first block 18 has a hollow sample probe 22 extending therefrom which is movable with the sampling head 12 between a first or sampling position where the free end 23 of the probe 22 is inserted into a sample cup 24 in a sample cup holder 25 (FIGS. 1 and 2), and a second or retracted position out of the path of travel of the cup 24.

In the first position of the probe 22 and the valve mechanism 17 the probe 22 is connected through the valve blocks 18 and 20 and a sample loop 34 to a sample pump (not shown) for withdrawing some of a liquid sample from the cup 24. In this way a given amount of sample is drawn, i.e., aspirated from the cup 24 and into the sample loop 34. At the same time, a source of reagent (not shown) is connected through the valve blocks 18 and 20 to a reagent pump (not shown) which is operated for filling the reagent pump with a quantity of reagent. Further details of the pump and control systems therefor can be obtained from the related applications, Ser. Nos. 191,248 and 285,196, the disclosures of which are incorporated herein by reference.

After a sufficient amount of sample has been drawn through the sample loop 34, the cylinder 13 is operated to move the probe out of the cup 24 and to its retracted position and at the same time to move the valve blocks 18 and 20 relative to each other. This action will shear off and trap a given amount (volume) of sample in the sample loop 34 while moving the blocks 18 and 20 to the second valve position.

When the valve mechanism 17 is in the second or delivery position, one end of the sample loop 34 is connected through the valve blocks 18 and 20 to the reagent pump which is now operated to pump reagent therefrom into the valve blocks 18 and 20. The other end of the sample loop 34 is connected to a tubing 36 leading to a receptacle, such as a reaction test tube. A shunt passage hereinafter to be described in detail shunts some of the reagent around the sample loop 34 to the outlet end of the loop 34 where it mixes with the sample being ejected from the sample loop 34 by the pressure of the reagent stream at the inlet end of the loop 34. In this way, the given amount of sample is simultaneously ejected from the sample loop 34, mixed with the reagent and delivered in a reagent-sample mixture to the reaction test tube. In the tube, the reagent reacts with the liquid sample and after a predetermined period of time the resulting mixute can be subjected to colorimetric measurements. In the case of straight dilution, the resulting mixture can be subjected to particle counting, etc.

At the same time the probe 22 and the outlet of the sample pump are connected to a source of scavenge vacuum (not shown) for vacuum scavenging liquid sample material therefrom and for sucking cleaning fluid through the probe 22 thereby to prepare the apparatus 10 for taking another sample as will be described in detail hereinafter.

Figure 2:
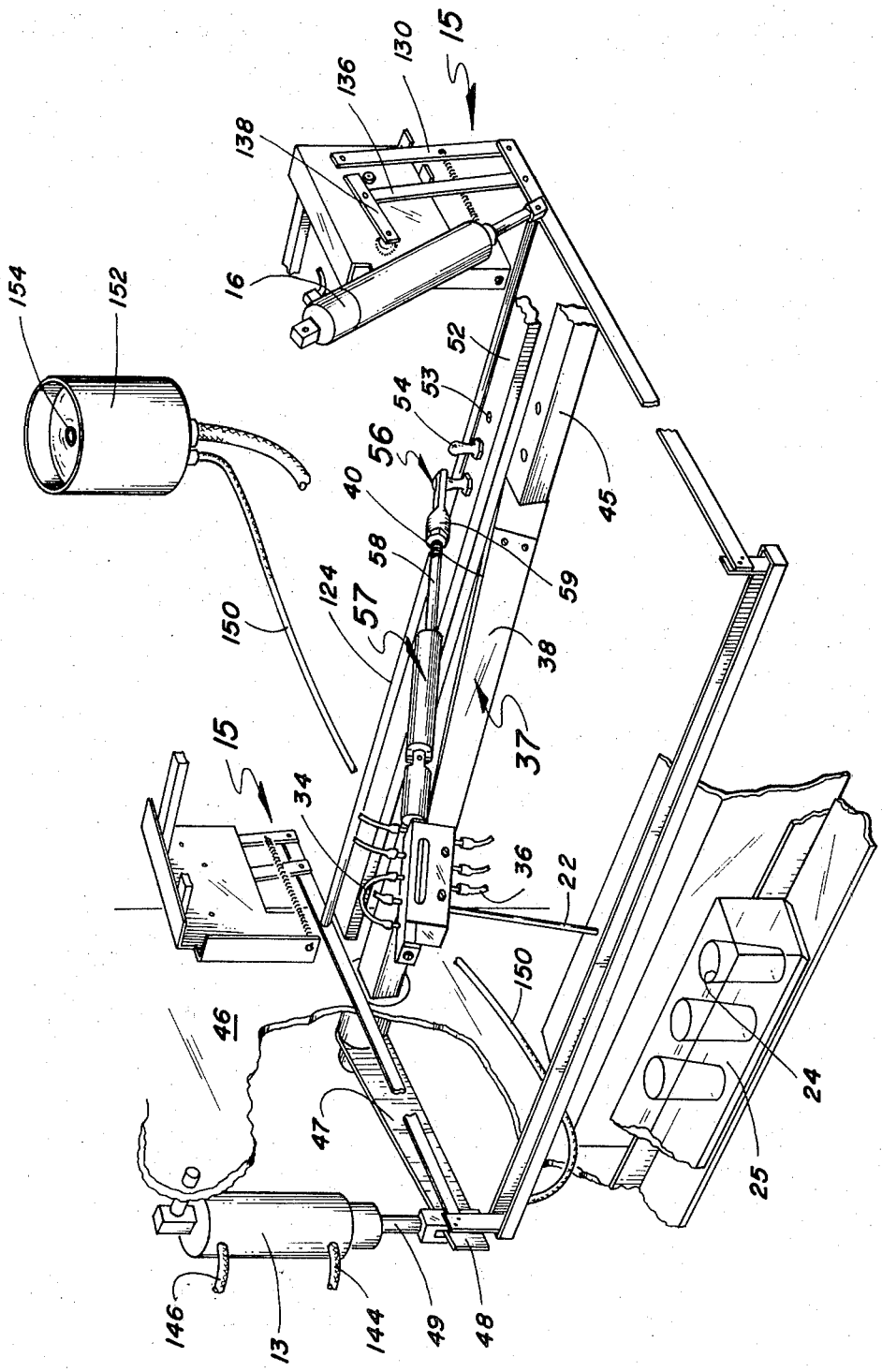
FIG. 2 is a perspective view of the apparatus similar to FIG. 1, but showing the trough in a lowered position underneath the probe of the sampling head.

The valve assembly 17 is supported at one end of an arm assembly 37 defined by two elongate plates 38 and 40. As shown in FIGS. 1 and 2, the valve block 18 is secured to and between the outer ends of the plates 38 and 40 by suitable fasteners.

The fasteners utilized in securing the arm plates 38 and 40 to the valve block 18 are also utilized to secure two plates 42 and 44 to the valve block 18. In this respect each plate 42, 44, is situated between the valve block 18 and one of the arm plates 38, 40.

As shown, the inner ends of the plates 38 and 40 have recesses which fit about a shaft 45 to facilitate the securing of the arm assembly 37 to the shaft 45.

The shaft 45 extends through and is journalled in a side wall 46 of a housing partially surrounding the sampling heads 12, and is connected on the other side of the wall 46 to a lever arm 47. A distal end 48 of the lever arm 47 is connected to a piston rod 49 of the cylinder 13. The cylinder 13 can be secured to the side wall 46, as shown. It will be apparent that reciprocation of the piston rod 49 will produce limited rotation of the shaft 45 to cause upward or downward movement of the sampling head 12 and the probe 22. The sampling head 12 is shown in the raised position of FIG. 1 with a lowered position of the probe 22 shown in phantom.

The housing also includes a back wall 51 and the shaft 45 is spaced from and extends parallel to the back wall 51. An elongate bar 52 is fixed to the back wall 51 and juts outwardly from the back wall 51 toward the shaft 45. The elongate bar 52 has a plurality of openings 53 each mounting a stud member 54 having a ball end 55. Each ball end 55 forms part of a ball and socket connection 56 for pivotally mounting one end of a linkage 57 extending from and connected to the upper valve block 20 of one of the sampling heads 12.

Figure 4:
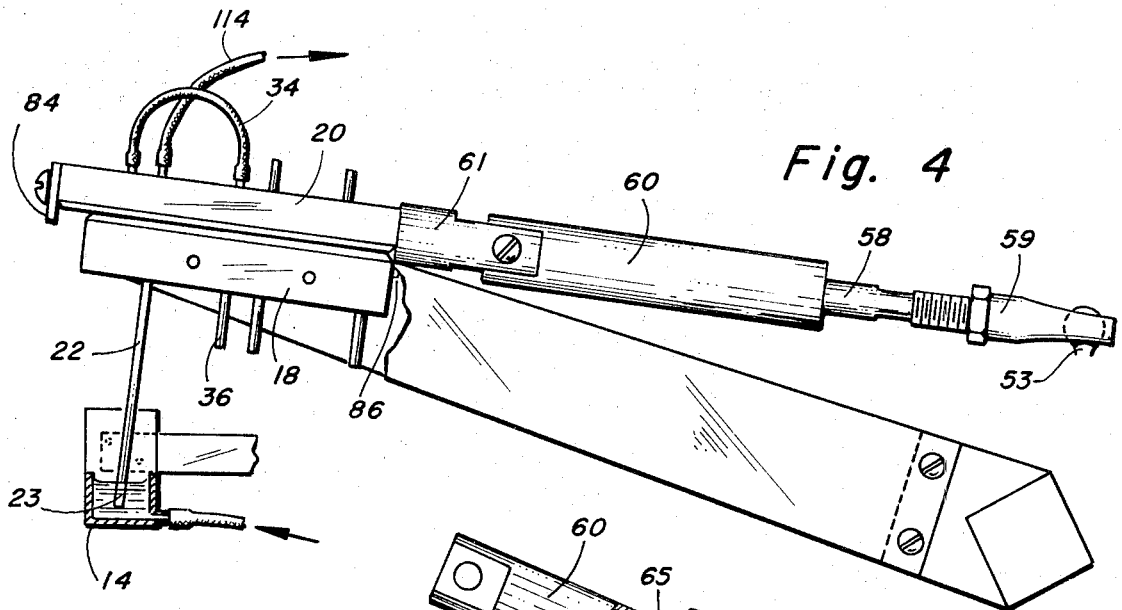
FIG. 4 is a side view of the sampling head with the probe in the trough.

Each linkage 57 includes a rod 58 adjustably and threadably connected to a socket member 59 of one of the ball and socket connections 56. As best shown in FIGS. 4–5 the other end of the rod 58 is received in a sleeve 60 which is connected to a bracket 61 fixed to the rear end of the valve block 20. A lost motion mechanism 62 is situated in the sleeve 60 and includes a spring 63 positioned between a seat 64 at the end of the rod 58 and a seat 65 at the end of a rod 66 connected to the block 20 and extending into the sleeve 60. A slip ring 67a on the rod 66 and a slip ring 67b in the sleeve 60 limit inner and outer movement of the seats 64 and 65, as will be explained in more detail hereinafter.

Figure 6:
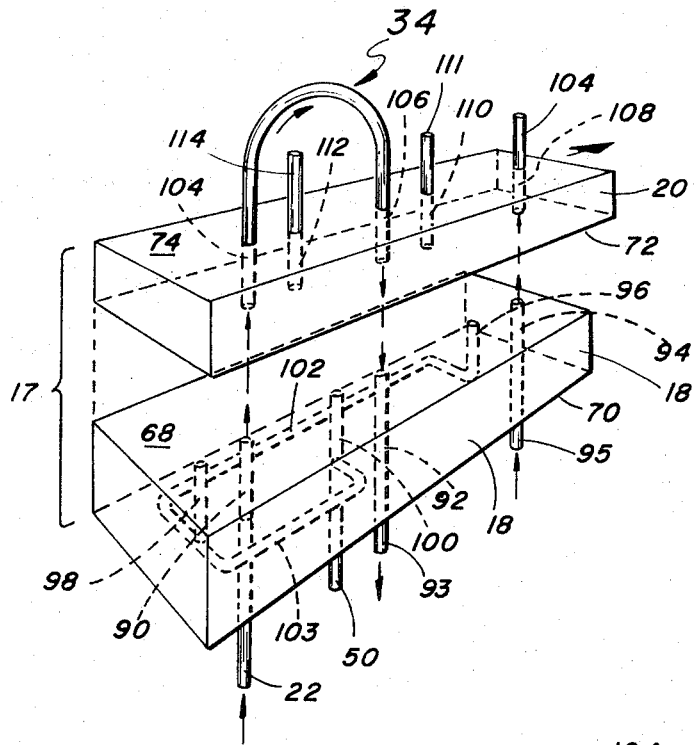
FIG. 6 is a diagrammatic view illustrating the relationship between the two valve blocks of the sampling head at a first or sampling position.

As best shown in FIG. 6, the first block 18 has an inner face 68 and an outer face 70. Likewise, the second valve block 20 has an inner face 72 and an outer face 74. According to the teachings of the present invention, the fluid connections are made and broken at the inner faces 68 and 72 of the blocks 18 and 20 which are held in tight sliding engagement. To provide a good seal between the inner faces 68 and 72 in the areas adjacent the port connections between the blocks 18 and 20, the blocks 18 and 20 are compressively loaded and the inner faces 68 and 72 are ground and lapped. Preferably, the inner faces 68 and 72 are formed from a very hard material which is ground and polished smooth to inhibit, if not prevent, galling of the inner faces 68 and 72. Because of pressure loading on the blocks they must be made from a material having high dimensional stability. Also, the material must be highly resistant to corrosion from the fluids passed therethrough. In one embodiment of the invention, the first block 18 is made of graphite and the second block 20 is made of stainless steel with the inner face 72 flame or plasma-sprayed with an aluminum oxide - silicon oxide composition.

As shown in FIG. 4, the block 20 is longer than the block 18. Movement of the block 20 relative to the block 18 is precisely limited by stop members 84 and 86 secured respectively to the ends of the block 20 in position to engage the ends of the block 18. Thus, when the arm assembly 37 is moved downwardly by the cylinder 13, movement of the arm assembly 37 is limited by engagement of the stop member 84 with one end of the valve block 18. Likewise, when the arm assembly 37 is moved upwardly by the cylinder 13, movement thereof is limited by engagement of the stop member 86 with the other end of the block 20. The positions of engagement between the stop members 84 and 86 and the respective ends of the block 20 also define the first and second valve positions of the valve mechanism 17.

Turning now to FIG. 6, the first valve block 18 has a number of galleries and passageways therein which are identified as follows: a sample pickup passageway 90 extending between the faces 68, 80 of the block 18 and connected at the outer face 70 to the aspirating probe 22; a sample extraction passageway 92 extending between the faces 68, 70 and connected at the outer face 70 to a tube or conduit 93 leading to the sample pump; a reagent supply passageway 94 extending between the faces 68, 70 and connected at the outer face 70 to a conduit 95 leading to the source of reagent; a first reagent transfer passageway 96 opening only to the inner face 68; a second reagent transfer passageway 98 also opening only to the inner face 68; a sample delivery passageway 100 extending between the faces of the block 18 and connected at the outer face 70 to the conduit 36; a gallery 102 connecting the first transfer passageway 96 with the second transfer passageway 98; and a shunt gallery 103 connecting the gallery 102 with the sample delivery passageway 100.

The second block 20 also has a number of passageways therein which are identified as follows: first and second passageways 104 and 106 which extend between the faces 72, 74 of the block 20 and which form part of the sample loop 34; a reagent delivery passageway 108 which extends between the faces 72, 74 of the block 20 and which is connected at the outer face 74 to a conduit 109 leading to the reagent pump; a first evacuation passageway 110 extending between the faces of the block 20 and connected at the outer face to a conduit 111 leading to the source of scavenge vacuum; a second evacuation passageway 112 which opens onto the inner face 72 and outer face 74 and which is connected to a conduit 114 leading also to the source of scavenge vacuum.

The passageways all extend normal to the faces of the blocks 18, 20 preferably are located on the longitudinal centerline of each block 18, 20.

In FIG. 6, the valve blocks 18, 20 are in the first or sample position. In this position, the port of the sample pickup passageway 90 is aligned and in communication with the port of the first passageway 104 of the sample loop 34, the port of the second passageway 106 being aligned and in communication with the sample extraction passageway 92 connected by the conduit 93 to the sample pump. At this time, the sample pump is operated to extract or aspirate some of the sample fluid from the sample cup 24 through the probe 22. The sample fluid is drawn part way into the conduit 93 but preferably not into the sample pump. Also, at this time, the reagent supply passageway 94 is aligned and in communication with the reagent delivery passageway 108 and the reagent pump is operated to draw a quantity of reagent from the reagent source into the reagent pump.

After a predetermined time the cylinder 13 is operated to move the sampling head 12 to the second or delivery position. At the same time the operation of the pumps are reversed so that in the second valve position which is shown in FIG. 7 the pumps urge fluid toward the valve mechanism 17.

It will be appreciated that when the valve blocks 18, 20 are moved relative to each other as the valve mechanism 17 is moved to its second position, the port openings of the first and second passageways 104 and 106 of the sample loop 34 at the inner face 72 at the block 20 are sheared so as to trap a given volume of sample in the sample loop 34.

Figure 7:
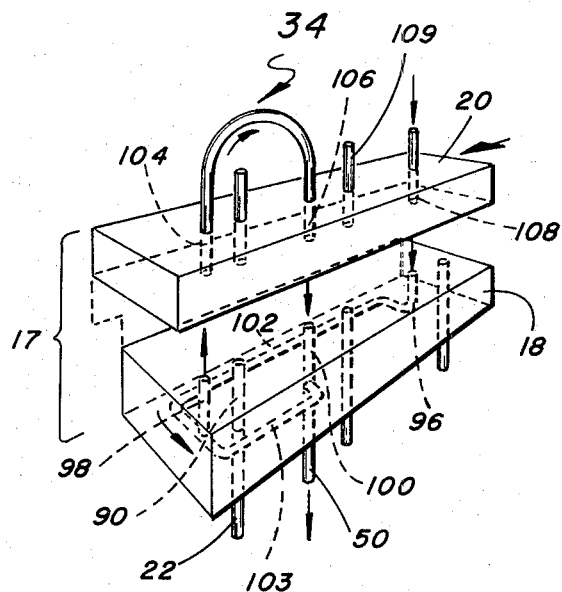
FIG. 7 is a diagrammatic view similar to that of FIG. 6 but illustrating the valve blocks in a second or mixing and delivering position.

In the second position of the valve mechanism 17 and as shown in FIG. 7, the reagent delivery passageway 108 is now aligned and in communication with the first reagent transfer passageway 96. At the same time, the second reagent transfer passageway 98 communicates with the first passageway 104 of the sample loop 34, i.e., communicates with the inlet port of the sample loop 34; and the second passageway 106 of the sample loop 34, i.e., the outlet port of the sample loop 34, communicates with the sample delivery passageway 100.

Preferably, the shunt gallery 103 which extends between the second reagent transfer passageway 98 and the sample delivery passageway 100 has a different cross section (diameter) than the sample loop 34. In this respect, the sample loop 34 preferably has a smaller cross section than the shunt gallery 103 so that a fraction of the reagent flows through the sample loop 34 rejoining the major reagent stream at the junction of the shunt gallery with the sample delivery passageway 100. At this junction the sample material is intermingled with the reagent stream so that the fluid emerging from the end of the delivery tube 36 comprises a mixture of sample and reagent. It is to be noted that the shunt gallery 103 has three functions.

First, it avoids passing the entire reagent stream through the sample loop 34. Since the loop 34 is of smaller cross section than the gallery 102, the loop 34 presents a higher impedance to fluid flow. However, the shunt gallery 103 prevents an undesirable high impedance to the flow of reagent through the sample loop 34 by providing a bypass or shunt for the flow of reagent.

Second, the proportions of the reagent passing through the shunt gallery 103 and the sample loop 34 are controlled by the relative sizes of the sample loop 34 and the shunt gallery 103. By proper selection of the cross section (diameter) of the shunt gallery 103 relative to the cross section of the sample loop 34, one can produce optimum intermingling of sample and reagent at the junction of the shunt gallery 103 with the sample delivery passageway 100.

Third, by minimizing the flow of reagent through the sample loop 34, damage to fragile elements such as blood cells in the sample material is avoided. In this respect, the relatively gentle flow of fluid through the shunt gallery minimizes damage to those elements which could be caused by high stream velocities and turbulent flow in a "straight through" system.

Figure 8:
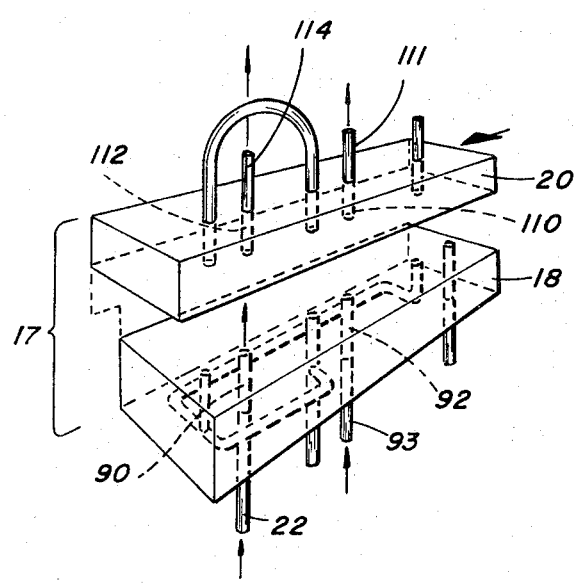
FIG. 8 is a diagrammatic view similar to that of FIG. 7 and illustrating the valve connections for passing cleaning fluid through the probe while the valve blocks are maintained in the second position.

At the same time that reagent is being mixed with the sample and is forcing the sample into the delivery conduit 36, the sample pickup passageway 90 and the sample extraction passageway 92 are being evacuated by the scavenge vacuum pump. In this respect and as best shown in FIG. 8, the sample pickup passageway 90 is now aligned and in communication with the second evacuation passageway 112 and the sample extraction passageway 92 is now aligned and in communication with the first evacuation passageway 110. Thus, in the second valve position, the scavenge vacuum pump extracts or evacuates most of the sample left in the passageway 90 (and the probe 22 connected thereto) and in the extraction passageway 92 (and the conduit 93 connected thereto). Also, the vacuum acting through conduit 93 on the sample pump cooperates with pressure supplied to the samle pump to return the same to its extracting position. As a result, the sampling head 12 will be ready to pick up another sample when it is moved back to its first position.

When the probe 22 is inserted into the liquid sample within the sample cup 24, capillary action of the liquid causes a meniscus to form about the outer surface of the probe. Then when the probe 22 is withdrawn from the liquid sample, the adhesion, cohesion and surface tension in the liquid meniscus causes some of the liquid sample to cling to the outer surface of the probe 22 and to form a drop at the end of the probe 22 which is quickly sucked up into the probe 22. The drop is usually formed as the probe 22 breaks away from the surface of the liquid. The drop normally is sucked up by the scavenging action before the probe 22 is inserted into a subsequent sample cup.

Of course, the faster the speed of withdrawal, the quicker the operation of the whole apparatus of which the sampling head 12 is a part. It will be appreciated, however, that if the speed of withdrawal of the probe 22 is very fast, a larger amount of fluid will be picked up on the outer surface of the probe 22 and it will take longer for all of the liquid to flow downwardly to the lower end of the probe 22 to be sucked into the probe 22. In fact all of the liquid picked up by the probe may not be sucked into the probe and wiping of the probe to prevent contamination or carry over into the next sample could become necessary for very fast speeds of withdrawal.

From emperical tests it has been determined that the amount of liquid which clings to the outer surface of the probe is directly related to the rate of withdrawal of the probe from the liquid sample. In this respect, rapid withdrawal of the probe leaves a substantial amount of liquid clinging thereto while very slow withdrawal leaves virtually no liquid on the outer surface of the probe. Although it is not known with aboslute certainty, it is believed that this phenomena is caused by the rate of relative movement between the meniscus and the probe. In other words, by controlling the relative rate of movement, the meniscus can be caused to recede on the probe without breaking. If it does not break, it leaves little or no liquid on the outer surface of the probe.

According to the teachings of the present invention the probe 22 is withdrawn at a maximum speed which results in minimum pickup of liquid sample on the outer surface of the probe 22.

Of course the optimum rate of withdrawal of a probe from a liquid in order to avoid surface contamination from the probe when it is inserted in another liquid also depends upon both the nature of the liquid and the nature of the probe surface.

For a metal probe with a smooth outer surface, e.g. a stainless steel probe, and an aqueous solution, emperical tests have shown that a speed of withdrawal no greater than one-half inch per second results in minimum clinging of fluid to, or pickup of fluid by, the outer surface of the probe when it is withdrawn from an aqueous solution.

Notwithstanding the application of suction to the probe 22 when the sampling head 12 is in the mixing and delivery position, often times, due to the viscosity of the sample and due to the small diameter of the probe, droplets of material cling to the inner wall of the probe. Also, sometimes the probe 22 becomes plugged due to the presence of fibrous material in the sample. In order to facilitate cleaning of the probe 22 should it become plugged with sample material, the probe 22 and the passageways 90 and 112 are so constructed that when the sampling head is in the mixing and delivering position the probe 22 and the passageways 90 and 112 are substantially coaxial to permit the insertion of a wire or cleaning element much akin to a pipe cleaner for cleaning the probe 22 and the passageways 90 and 112.

To obviate the sometimes occurring problem of droplets of sample clinging to the inner walls of the probe 22, the apparatus 10 includes the trough 14 and the mechanism 15 for moving the same into a position where cleaning fluid in the trough can be sucked or aspirated through the probe 22 by the scavenge vacuum pump.

As best shown in FIGS. 1 and 2, the trough 14 is elongate and has end plates 120 and 121 extending upwardly therefrom. Each of the end plates 121 is connected at its upper end to a lever arm 122, 123. The lever arms 122, 123 are interconnected by a cross shaft or crossbar 124 (FIG. 2). Each of the lever arms 122, 123 is connected to and forms part of the moving mechanism 15 which is comprised of several members which operate in a manner much akin to a pantograph. The construction and operation of the moving mechanism 15 on the right-hand side of the apparatus, viewing the same in FIG. 1, will now be described in detail with reference to FIGS. 3A - 3C.

As shown, the upper end of the cylinder 16 is pivotally connected to a supporting bracket 126 and a piston rod 128 extending from the cylinder 16 is pivotally connected to the lever arm 123. The inner end of the lever arm 123 is pivotally connected to a pivot arm 130 at the lower end thereof. The upper end of the pivot arm 130 is pivotally connected to a supporting bracket 132. The supporting bracket 132 is generally in the form of a plate vertically disposed and has two ears or tabs 133 and 134 which extend outwardly from the bracket or plate 132 on either side of the pivot arm 130 and forms stops for limiting pivoting movement of the pivot arm 130 about its connection to the bracket 132. A swing arm 136 is pivotally connected to the lever arm 123 at a point between the pivot connection of the pivot arm 130 and the pivot connection of the piston rod 128 respectively to the lever arm 123. The swing arm 136 is pivotally connected at its upper end to a translation arm 138 at a point intermediate the ends of the arm 138. One end of the arm 138 is pivotally connected to the bracket 132 and the other end of the arm 138 is adapted to engage and rest against a stop pin 140 which is fixed to and extends outwardly from the plate 132.

To provide smooth controlled movement of the mechanism 15 and the trough 14 a spring 142 is connected between the pivot arm 130 and a tab (not shown) on the plate 132 adjacent the front edge thereof.

Figure 3A:
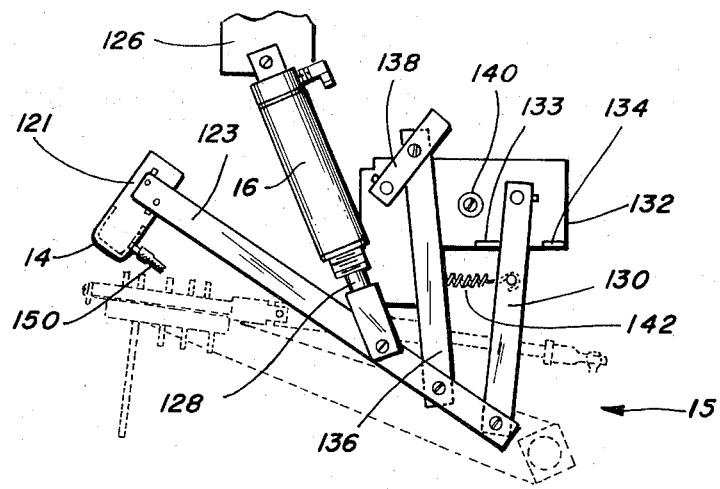
FIG. 3A is a side view of the mechanisms for moving the trough with the trough shown in its raised position.

FIG. 3A illustrates the trough in a raised or retracted position where the piston rod 128 is in a retracted position within the cylinder 16. It will be noted that at this point the trough 14 is above the sampling head 12 and out of the path of movement of the head 12.

Figure 3B:
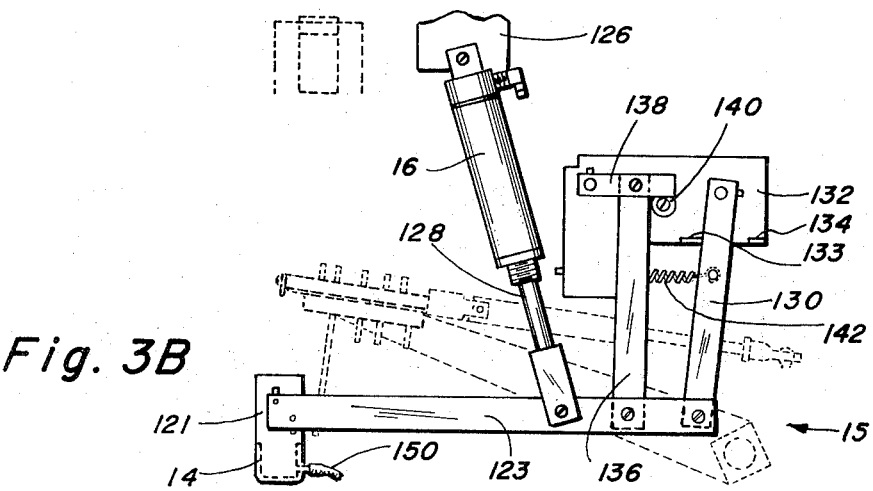
FIG. 3B is a side view similar to FIG. 3A but showing the trough in a lowered position.
Figure 3C:
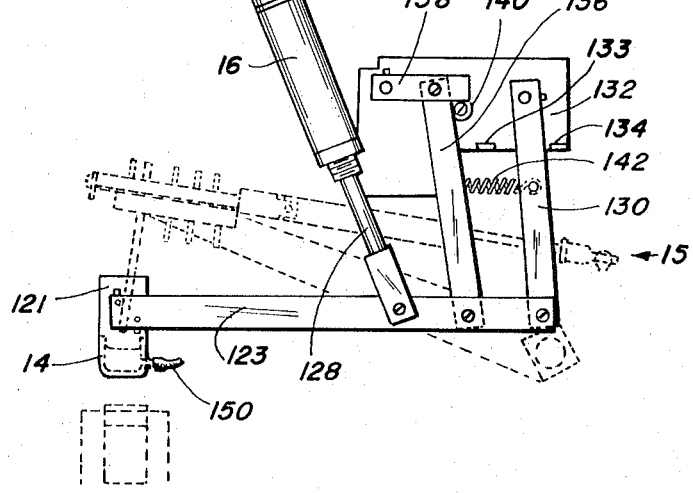
FIG. 3C is a side view similar to FIG. 3B but showing the trough moved under the probe.

After the sampling head has picked up a quantity of sample from a sample cup 24 in the holder 25, the head is raised by applying pressure to the lower end of the cylinder 13 via the conduit 144 (FIG. 1) and by applying vacuum to the upper end of the cylinder 13 via the conduit 146. The head 12 shown in FIGS. 3A - 3C is in the upper raised position identical to the position of the head 12 shown in FIG. 1. Now, after the head 12 has been in this position for a short time, a suitable control mechanism (not shown) will cause operation of the cylinder 16 to extend the rod 128 therefrom. As this occurs, the lever arm 123 is moved arcuately downwardly about the pivot connection between the pivot arm 130 and the lever arm 123. The pivot arm 130 does not move in view of the spring tension applied thereto via the spring 142. At the same time, the swing arm 136 is moving downwardly and swinging to the right viewing the same as shown in FIGS. 3A - 3C. This results in the translation arm 138 moving downwardly. As a result of the pivot connection between the translation arm 138 and the swing arm 136 moving arcuately downwardly, the upper end of the swing arm 136 is moved to the right until the free or distal end of the translation arm 138 engages the pin 140. This position of the mechanism 15 and the cylinder 16 is shown in FIG. 3B. At this point in time, the trough 14 is at its lower extent of arcuate downward movement and is in a position between the lower end of the probe 22 and the sample cup holder 25 as shown in FIG. 3B.

Further extension of the piston rod 128 from the cylinder 16 now causes the swing arm 136 to pivot at both ends and move rearwardly to the right. This also causes the pivot arm 130 to move rearwardly to the right until it engages the stop 134. This results in a generally linear movement of the trough 14 to the right viewing the same as shown in FIG. 3C. The trough is also moved slightly upwardly until trough 14 is in position beneath the lower end 23 of the probe 22.

Figure 5A:
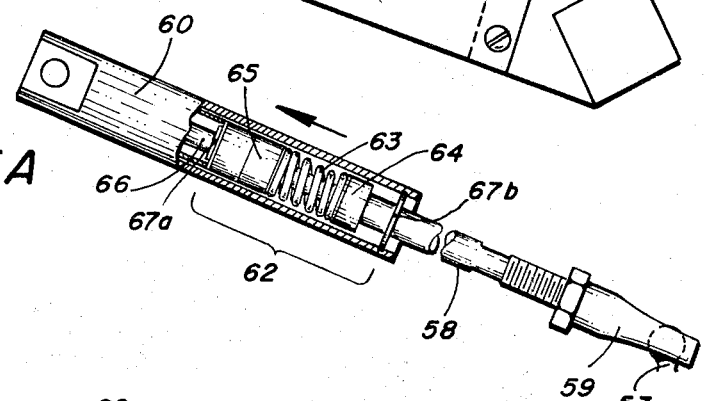
FIG. 5A is a fragmentary side view with portions broken away to show the position of a spring mechanism of the head when the head is in the raised sample mixing and delivery position.
Figure 5B:
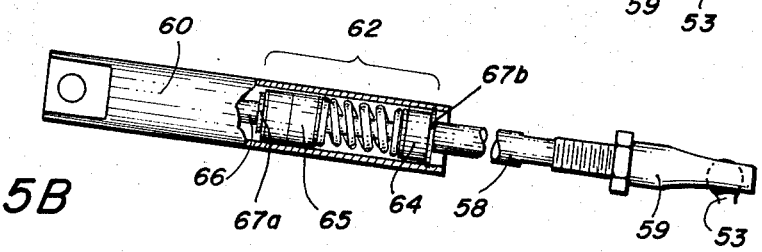
FIG. 5B is a fragmentary side view of the spring mechanism when the head is in the probe cleaning position.
Figure 5C:
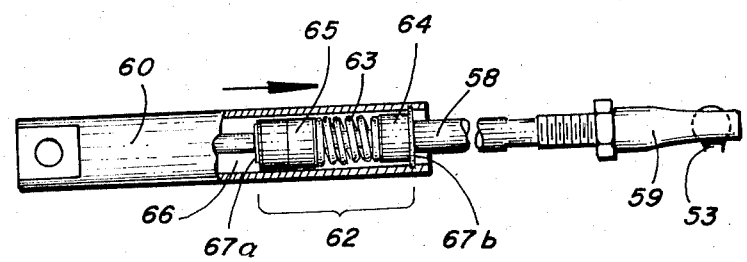
FIG. 5C is a fragmentary side view of the spring mechanism when the head is in the sampling position.

As best shown in FIG. 2, a fluid delivery conduit 150 is connected between the trough 14 and a fluid catch basin 152. The fluid catch basin 152 has a standpipe 154 therein which has an open upper end situated below the level of the trough 14 when it is in its raised position shown in FIG. 1. However, when the trough 14 is in its lowered position as shown in FIGS. 2 and 3C, the height of de-ionized water or other cleaning fluid in the catch basin 152 is above the trough 14. At this point in time the control mechanism for the apparatus maintains all the mechanisms of the apparatus in a status quo position while water flows into the trough 14. After a predetermined period of time the trough 14 is filled with a supply of water and the control mechanism for the apparatus then applies either pressure or vacuum via conduits 144 and 146 to both ends of the cylinder 13. As a result, fluid pressure on the piston within the cylinder 13 is neutralized or equalized. Turning to FIGS. 5A - 5C, it will be understood that in the sample mixing and delivering position the spring 63 is compressed within the sleeve 60. Now, when the forces on the piston in the cylinder 13 are neutralized, the spring 63 is allowed to expand until it reaches a neutral or at rest position which is shown in FIG. 5B. In this position, the sampling head 12 and probe 22 have been lowered a short distance so as to bring the lower end 23 of the probe 22 into the trough 14. Also and as explained above, suction has been maintained on the conduit 114 connected, via passageways 112 and 90, to the probe 22. It will be appreciated that when the sampling head 12 and probe 22 are lowered as the spring 63 expands, the lost motion mechanism 62 permits the valve blocks 18 and 20 to remain in the second valve position. As a result, as the probe 22 goes into the trough, suction pulling air through the probe will then pull water through the probe 22 and carry it to the scavange vacuum pump from which it is thrown away. After a predetermined amount of cleaning fluid or water is drawn through the probe 22 the control mechanism for the apparatus supplies fluid pressure to the conduit 144 and vacuum to the conduit 146 to cause the piston within the cylinder 13 to move the probe of the sampling head 12 out of the trough 14. Subsequently, the cylinder 16 is operated to retract the piston rod 128 and thereby cause linear forward and then arcuate upward movement of the trough 14 to its raised or retracted position shown in FIGS. 1 and 3A. The sample cup holder 25 will then be advanced by a mechanism not shown to position another sample cup 24 beneath the path of arcuate movement of the probe 22 of the head 12 shown in FIGS. 1 and 2. The apparatus will then be operated again in the manner described above to lower the probe 22 into the succeeding sample cup to withdraw a quantity of sample therefrom in the manner described above.

It will be understood from the foregoing description that the apparatus of the invention provides for relative movement between the probe 22 and the trough 14 for the purpose of bringing the probe 22 into the trough 14 so that cleaning fluid such as water can be drawn through the probe 22. Also, it will be understood that the mechanisms which provide for the relative movement include the moving mechanism 15 for the trough 14 and the lost motion mechanism 62 in the linkage 57 for the sampling head 12. In this respect and as shown in FIGS. 5A - 5C, in the upper or sample mixing and delivering position, the spring 63 is compressed between the seats 64 and 66, while in the neutral position where the probe 22 is in the trough 14 the spring is in a noncompressed position as shown in FIG. 5B. Lastly, when the sampling head is in the sample pickup position, the spring 63 is compresssed as shown in FIGS. 5C.

Although not described or shown in detail, it will be understood that the moving mechanism 15 at the left-hand side of the apparatus viewing the same as shown in FIGS. 1 and 2, is substantially a mirror image of the mechanism 15 on the right-hand side without, however, the cylinder 16. In this respect, only one cylinder 16 is provided. Also, the spring 142 could be omitted from the right-hand mechanism 15 and utilized only on the left-hand mechanism 15.

It will be apparent from the foregoing description that obvious modifications and variations can be made to the apparatus for causing cleaning fluid to be drawn through the probe without departing from the spirit and scope of the invention. For example, various mechanisms can be provided for moving a trough from an upper retracted position to a lower water-filling position and then for moving the trough into position under the probe. Also, the trough could be moved upwardly onto the probe or as in the apparatus described above the probe could be lowered into the trough. One example of such other apparatus includes cables for raising and lowering a trough and a mechanism for tilting the trough to position in the path of movement of the probe 22. Then the probe is lowered in the manner described above and moves arcuately downwardly into the tilted trough. Accordingly, in view of the foregoing, the scope of the invention is only to be limited as necessitated by the accompanying claims.

What it is desired to secure by Letters Patent of the United States is:

1. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means operable upon movement of said probe to said sampling position for connecting said probe to means for withdrawing fluid from the sample container through said probe, and means for moving said probe and simultaneously operating said valve means whereby said valve means is operated by said moving means to connect said probe to the withdrawing means at the same time said probe is moved by said moving means to said sampling position, said valve means including first and second movable valve blocks each having at least one passageway therethrough, said passageways being aligned with each other and with said probe when said probe is in said retracted position and said valve means is in a sample delivery and probe cleaning position, and said moving means includes lost motion means which permits said head to be lowered a predetermined distance with said valve blocks maintained in place defining said sample delivery and probe cleaning position of said valve means.

2. Apparatus for cleaning a sample pickup probe between samplings of fluid with the probe which moves in a path between an upper position and a lower sampling position, said apparatus including a trough, a system for delivering cleaning fluid to said trough at predetermined times and moving means for causing relative movement between said trough and the probe to bring the probe into the trough whereby cleaning fluid can be drawn through the probe for cleaning same, said moving means being operable to move said trough from an upper retracted position through an arcuate path to a lower position and then laterally to a position in the path of movement of the sampling probe, and said moving means including dual mechanical mechanisms each connected to one end of the trough, each mechanism including a lever arm, a supporting bracket, a pivot arm pivotally connected at one end to said supporting bracket and at the other end to said lever arm, laterally spaced apart stops on said bracket on opposite sides of said pivot arm for limiting lateral movement thereof, a spring connected between a point on said bracket and said pivot arm, a translation arm pivotally connected to said bracket, a stop pin on said bracket spaced laterally from the pivot connection of said translation arm and located in the path of movement of the distal end of said translation arm for limiting downward arcuate movement of said translation arm, and a swing arm pivotally connected to said translation arm intermediate the ends thereof and pivotally connected to said lever arm, said means for moving said trough also including at least one fluid actuated cylinder which is pivotally connected at one end to a supporting structure and which has a piston rod extending from said cylinder and pivotally connected to said lever arm, with said swing arm pivotally connected to said lever arm at a point between the pivot connection of said pivot arm and the pivot connection of said piston rod respectively to said lever arm.

3. Apparatus for cleaning a sample pickup probe between samplings of fluid with said probe which moves in a path between an upper position and a lower sampling position, said apparatus including a trough, a system for delivering cleaning fluid to said trough at predetermined times, a sampling head which has said probe mounted therein and which is mounted for arcuate movement, and moving means for causing relative movement between said trough and said probe to bring said probe into said trough whereby cleaning fluid can be drawn through said probe for cleaning same, said moving means including probe moving means for moving said probe downwardly a predetermined distance after said trough has been moved to a position in the path of movement of said probe, said probe moving means including a lost motion mechanism connected to said sampling head and a fluid actuated cylinder for causing generally vertical, arcuate movement of said sampling head, said lost motion mechanism being operable to move said sampling head downwardly a predetermined distance when said fluid actuated cylinder is neutralized.

4. The apparatus according to claim 3 wherein said lost motion mechanism includes a spring which is compressed when said sampling head is in an upper non-sampling position and which expands to a relaxed position to move the sampling head downwardly a short distance when said cylinder is neutralized.

5. Apparatus for cleaning a sample pickup probe between samplings of fluid with the probe which moves in a path between an upper position and a lower sampling position, said apparatus including a trough, a fluid delivery system for delivering cleaning fluid to said trough at predetermined times, and moving means for causing relative movement between said trough and the probe to bring the probe into said troubh whereby cleaning fluid can be drawn through the probe for cleaning same, said moving means being operable to move said trough from an upper retracted position through an arcuate path to a lower position and then laterally to a position in the path of movement of the probe, and said fluid delivery system includes a fluid conduit connection between said trough and a basin of fluid, said basin of fluid having a level therein below the level of said trough when said trough is in a raised retracted position and which is above said trough when said trough is in said lowered position whereby cleaning fluid in said basin can flow by gravity into said trough.

6. Apparatus for cleaning a sample pickup probe between samplings of fluid with the probe which moves in a path between an upper position and a lower sampling position, said apparatus including a trough, a system for delivering cleaning fluid to said trough at predetermined times, and moving means for causing relative movement between said trough and the probe to bring the probe into said trough whereby cleaning fluid can be drawn through the probe for cleaning same, said moving means including trough moving means operable to move said trough from an upper retracted position through an arcuate path to a lower position and then laterally to a position in the path of movement of the sampling probe, and probe moving means operable to cause downward movement of the probe after said trough has been moved into the path of movement of the probe.

* * * * *

UNITED STATES PATENT OFFICE
CERTIFICATE OF CORRECTION

PATENT NO. : 3,863,507
DATED : February 4, 1975
INVENTOR(S) : ALAN RICHARDSON JONES and THOMAS J. GODIN It is certified that error appears in the above-identified patent and that said Letters Patent are hereby corrected as shown below:

The title of the application - change from "SAMPLE MIXING AND METERING APPARATUS" to --SAMPLING HEAD AND WASH SYSTEM THEREFOR--

Signed and sealed this 20th day of May 1975.

(SEAL)
Attest:

RUTH C. MASON
Attesting Officer

C. MARSHALL DANN
Commissioner of Patents
and Trademarks